US006785579B2

(12) United States Patent
Huang et al.

(10) Patent No.: US 6,785,579 B2
(45) Date of Patent: Aug. 31, 2004

(54) SYSTEM AND METHOD FOR CREATING A CONTROLLING DEVICE

(75) Inventors: Steve Lan-Ping Huang, Placentia, CA (US); Kim-Thoa Thi Nguyen, Yorba Linda, CA (US); Han-Sheng Yuh, Walnut, CA (US); JianJun Cao, Cypress, CA (US); My Thien Do, Anaheim, CA (US)

(73) Assignee: Universal Electronics Inc., Cypress, CA (US)

( * ) Notice: Subject to any disclaimer, the term of this patent is extended or adjusted under 35 U.S.C. 154(b) by 0 days.

(21) Appl. No.: 10/463,153

(22) Filed: Jun. 17, 2003

(65) Prior Publication Data

US 2003/0233664 A1 Dec. 18, 2003

Related U.S. Application Data

(63) Continuation of application No. 09/716,888, filed on Nov. 20, 2000, now Pat. No. 6,640,144.

(51) Int. Cl.[7] .............................................. G05B 19/18

(52) U.S. Cl. .............................. 700/65; 700/2; 700/66; 700/83; 700/84; 359/148; 379/102.01; 379/102.02; 379/102.03; 341/23; 345/171; 345/172; 345/158; 345/740; 345/741; 345/2.1; 345/2.3; 345/168; 345/169

(58) Field of Search ............................... 700/65, 2, 66, 700/83, 84; 359/148; 379/102.01, 102.02, 102.03; 341/23; 345/171–172, 158, 740, 741, 2.1, 2.3, 168–169

(56) References Cited

U.S. PATENT DOCUMENTS

| | | | | | |
|---|---|---|---|---|---|
| 4,866,434 | A | * | 9/1989 | Keenan | 340/825.72 |
| 5,909,183 | A | * | 6/1999 | Borgstahl et al. | 340/825.22 |
| 6,127,941 | A | * | 10/2000 | Van Ryzin | 340/825.69 |
| 6,608,638 | B1 | * | 8/2003 | Kodosky et al. | 345/771 |

* cited by examiner

*Primary Examiner*—Anthony Knight
*Assistant Examiner*—Thomas Pham
(74) *Attorney, Agent, or Firm*—Gary R. Jarosik

(57) ABSTRACT

A system and method for creating a controlling device. In response to a user specifying one or more operating criteria for the controlling device, the system selects executable instructions from a library of executable instructions and command code sets from a library of command code sets that are to be stored in the memory of the controlling device. In addition, the system uses the criteria to suggest command key/command code mappings for use within the controlling device. The user may interact with the system to modify the selected executable instructions, command code sets, and command key/command code mappings. When stored in the memory of the controlling device, the executable instructions are to be used to perform various operations and functions within the controlling device and the command codes are to be transmitted from the controlling device to command the operation of controllable devices in response to activation of one or more of the command keys.

12 Claims, 9 Drawing Sheets

| Physical Keys (Outrons) | A | C | D | H | J | K | L | M | N |
|---|---|---|---|---|---|---|---|---|---|
| K DP0 (DP0) | DP0 | DP0 | DP0 | DP0 | DP0 | DP0 | DP0 | DP0 | DP0 |
| K DP1 (DP1) | DP1 | DP1 | DP1 | DP1 | DP1 | DP1 | DP1 | DP1 | DP1 |
| K DP2 (DP2) | DP2 | DP2 | DP2 | DP2 | DP2 | DP2 | DP2 | DP2 | DP2 |
| K DP3 (DP3) | DP3 | DP3 | DP3 | DP3 | DP3 | DP3 | DP3 | DP3 | DP3 |
| K DP4 (DP4) | DP4 | DP4 | DP4 | DP4 | DP4 | DP4 | DP4 | DP4 | DP4 |
| K DP5 (DP5) | DP5 | DP5 | DP5 | DP5 | DP5 | DP5 | DP5 | DP5 | DP5 |
| K DP6 (DP6) | DP6 | DP6 | DP6 | DP6 | DP6 | DP6 | DP6 | DP6 | DP6 |
| K DP7 (DP7) | DP7 | DP7 | DP7 | DP7 | DP7 | DP7 | DP7 | DP7 | DP7 |
| K DP8 (DP8) | DP8 | DP8 | DP8 | DP8 | DP8 | DP8 | DP8 | DP8 | DP8 |
| K DP9 (DP9) | DP9 | DP9 | DP9 | DP9 | DP9 | DP9 | DP9 | DP9 | DP9 |
| K VL+(VL+) | VL+ | VL+ | VL+ | VL+ | VL+ | VL+ | VL+ | VL+ | VL+ |
| K VL-(VL-) | VL- | VL- | VL- | VL- | VL- | VL- | VL- | VL- | VL- |
| K MUT(MUT) | MUT | MUT | MUT | MUT | MUT | MUT | MUT | MUT | MUT |
| K CH+(CH+) | CH+ | CH+ | CH+ | CH+ | CH+ | CH+ | CH+ | CH+ | CH+ |
| K CH-(CH-) | CH- | CH- | CH- | CH- | CH- | CH- | CH- | CH- | CH- |
| K PWR(PWR) | PWR | PWR | PWR | PWR | PWR | PWR | PWR | PWR | PWR |
| K ENT(ENTER) | | ENT | | | ENT | | ENT | | ENT |
| K RCL(RECALL) | | LST | | | | | | | |
| K FFD(FAST FORWARD) | FFD | | FFD | | FFD | FFD | FFD | FFD | |
| K REW(REWIND) | REW | | REW | | REW | REW | REW | REW | |
| K PLA(PLAY) | PLA | | PLA | | PLA | PLA | PLA | PLA | |
| K STP(STOP) | STP | | STP | | STP | STP | STP | STP | |
| K PAU(PAUSE) | PAU | | PAU | | PAU | PAU | PAU | PAU | |
| K REC(RECORD) | REC | | REC | | REC | REC | | REC | |
| K FFD(FAST FORWARD) | | | | | | | | | |
| K REW(REWIND) | | | | | | | | | |
| K PLA(PLAY) | | | | | | | | | |
| K STP(STOP) | | | | | | | | | |
| K PAU(PAUSE) | | | | | | | | | |
| K REC(RECORD) | | | | | | | | | |

Confirm Cancel

Mode/Device: A MODE

| Outron | Label |
|---|---|
| K SEL | INPUT SELECT |
| K SUR | SURROUND MODE |
| K SDF | SURROUND ON/.. |
| K SU+ | SURROUND CEN.. |
| K SU- | SURROUND CEN.. |
| K BL< | BALANCE< |
| K BL> | BALANCE> |
| K DA+ | DELAY + |
| K DA- | DELAY - |
| K CNM | CENTER MODE |
| K RR+ | REAR LEVEL + |
| K RR- | REAR LEVEL - |
| K SR+ | SURROUND RIGH. |
| K SR- | SURROUND RIGH. |
| K SF+ | SURROUND LEFT |
| K SF- | SURROUND LEFT |
| K PRO | PRO LOGIC |
| K SUP | SURROUND SOU.. |
| K BND | BAND |
| K TST | TEST TONE |
| K LDN | LOUDNESS |
| K BBT | BASS BOOST |
| K DIR | DIRECT |
| K EF+ | EFFECT + |
| K EF- | EFFECT - |
| K DYT | DELAY TIME |
| K CDK | CD |
| K TAP | TAPE |

FIG. 10

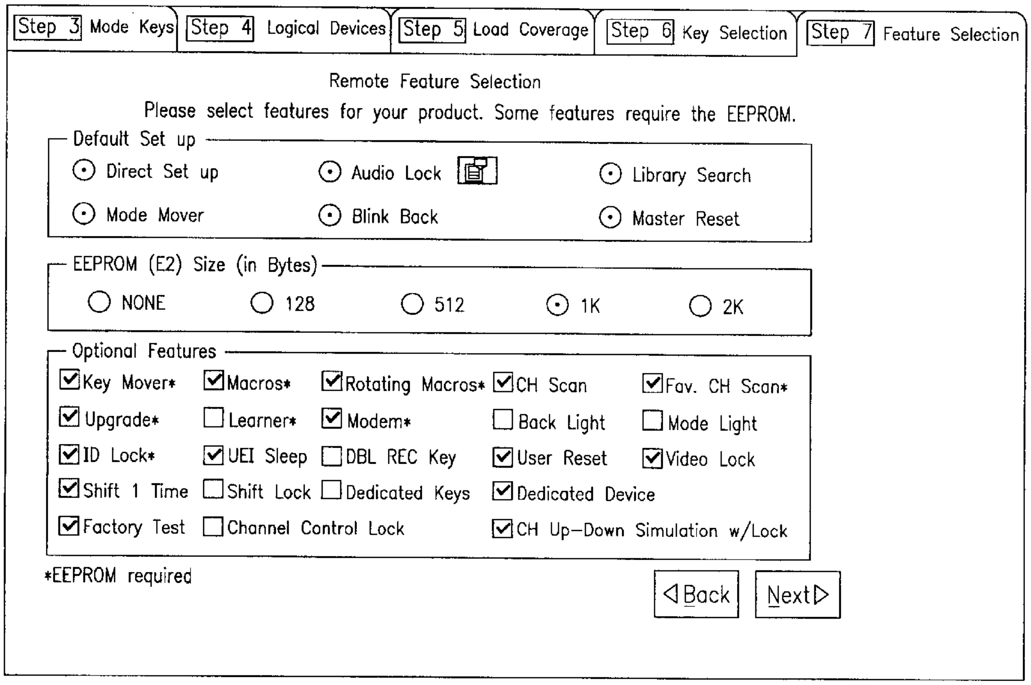

FIG. 11

Keyboard Matrix Setting

Note:

1. "Auto Assign" will automatically assign keys from the "Key Lists" to empty key boxes.

2. Drag a key from the list or a box and drop it to the box you want to. If there is a key in the box already, both keys will be swapped.

SYSTEM AND METHOD FOR CREATING A CONTROLLING DEVICE

This application is a continuation of and claims the benefit of U.S. Application Ser. No. 09/716,888, filed Nov. 20, 2000, now U.S. Pat. No. 6,640,144.

BACKGROUND OF THE INVENTION

This invention relates generally to controlling devices and, more particularly, relates to a system and method for creating a controlling device such as a universal remote control.

Controlling devices are known in the art. For example, U.S. Pat. No. 5,689,353 discloses a universal remote control which can be coupled via coded signals with a receiver built into various types of consumer appliances. In this manner, the universal remote control can be used to transmit a command code signal to the consumer appliances to control the operation of the consumer appliance(s) that are adapted to respond to the command code signal.

For controlling the operation of the different types of consumer appliances, a command code library is stored in the memory of the controlling device. As will be appreciated, a command code library is required since different consumer appliances and/or consumer appliances manufactured by different manufacturers typically have different coding formats by which the command codes are transmitted. Within the command code library, the command codes that are transmitted using a common coding format (i.e., commands for commanding the operations of a given type of consumer appliance of a given consumer appliance manufacturer) are grouped into a command code set.

It is also known in the art to store executable instructions in the memory of a controlling device for use in controlling the operation and features of the controlling device. By way of example, U.S. Pat. Nos. 5,959,751 and 6,014,092 disclose a universal remote control having executable instructions that allow a user to assign one or more command codes to a selected key. In accordance with this described feature, activation of the selected key will cause the controlling device to transmit to the consumer appliances the command code(s) that have been assigned to the selected key.

Presently, creating a controlling device is a time consuming and, therefore, costly endeavor. In this regard, creating a controlling device requires the manual selection of the command codes and programming of the executable instructions that are to be stored in the memory of the controlling device. It is also requires that the layout of the intended keyboard for the controlling device be manually created keeping in mind the proposed command code library and features to be supported by the controlling device. Manually performing these tasks suffers the disadvantage of failing to create a controlling device that adequately balances the needs of an end user against the development cost of the controlling device.

SUMMARY OF THE INVENTION

To overcome this disadvantage, the subject invention provides a system and method for creating a controlling device. The controlling device is created by a user specifying one or more operating criteria for the controlling device. By way of example, operating criteria may include the intended market for the controlling device, the intended end use of the controlling device, the types of devices the controlling device is intended to control, the functions intended to be supported within the controlling device, the size of the memory within the controlling device, and/or the processor chip within the controlling device.

From the specified criteria, the system will select executable instructions from a library of executable instructions and command code sets from a library of command code sets that are to be stored in the memory of the controlling device. In addition, the system will suggest command key/command code mappings for use within the controlling device. The user may interact with the system to modify the selected executable instructions, command code sets, and command key/command code mappings. When stored in the memory of the controlling device, the executable instructions are to be used to perform various operations and functions within the controlling device and the command codes are to be transmitted from the controlling device to command the operation of different types of controllable devices in response to activation of one or more of the command keys.

A better understanding of the objects, advantages, features, properties and relationships of the invention will be obtained from the following detailed description and accompanying drawings which set forth an illustrative embodiment and which are indicative of the various ways in which the principles of the invention may be employed.

BRIEF DESCRIPTION OF THE DRAWINGS

For a better understanding of the invention, reference may be had to a preferred embodiment shown in the following drawings in which:

FIG. 10 illustrates an exemplary screen shot of a GUI by which the user maps the physical keys to functions in accordance with the method illustrated in FIGS. 1–3;

FIG. 11 illustrates an exemplary screen shot of a GUI by which the user selects features to be supported by the executable instructions to be included in the controlling device to be created in accordance with the method illustrated in FIGS. 1–3;

DETAILED DESCRIPTION

Figure 1:
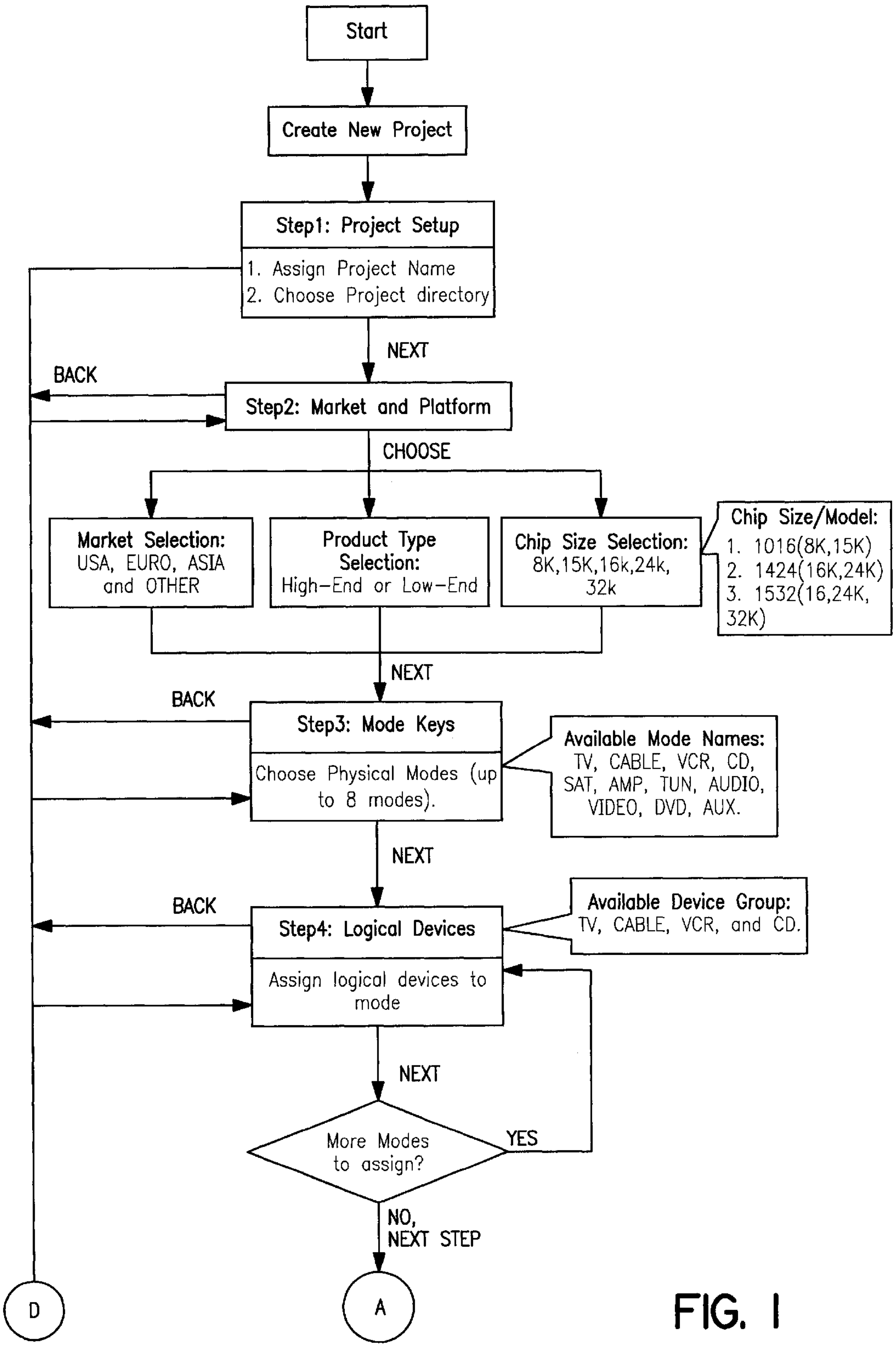
FIGS. 1–3 illustrate a flow chart diagram of an exemplary method by which a controlling device can be created.

Turning now to the figures, wherein like reference numerals refer to like elements, there is illustrated a system and method for creating a controlling device. The system and method may be used to establish a command code library, executable instructions which implement specific features, and keyboard layout for the controlling device. Generally, the command code library, features, and keyboard layout are established as a function of the intended end use of the controlling device as well as the processor type and memory size to be included in the controlling device.

The command code library comprises a plurality of command codes, grouped in command code sets, that may be transmitted from the controlling device, in response to activation of a command key, to remotely control the operation of one or more consumer appliances. Consumer appliances that are especially adapted for remote control include TVs, VCRs, DVD players, thermostats, fans, entry systems, and other like home appliances. The features of the controlling device, such as favorite key setup, macro key setup, etc., are performed in accordance with executable instructions that are used to control the operation of the controlling device itself. The command code library and executable instructions are stored in the memory (e.g., RAM, ROM, EEPROM) associated with the controlling device. Examples of controlling devices include universal remote controls, personal digital assistants (PDAs), expanded-function cellular telephones and home computers. As will be understood by those of ordinary skill in the art, the command codes that comprise the command code library may be transmitted from the controlling device to the consumer appliances by any suitable wired or wireless transmission means such as IR, radio frequency (RF), or the like.

More specifically, the method that is the subject of the invention is performed in connection with a computer that is under the control of computer executable instructions. The computer need not be limited to a personal computer but may include hand-held devices, multiprocessor systems, microprocessor-based or programmable consumer electronics, minicomputers, mainframe computers, and the like. The computer executable instructions may include routines, programs, objects, components, and/or data structures that perform particular tasks. While described in the context of a single computer, the computer executable instructions may be distributed among a plurality of computers connected via a network, such as the Internet.

For performing the tasks in accordance with the computer executable instructions, the computer includes a display, a processing unit, a system memory, and a system bus that couples the system memory to the processing unit. A mouse, keyboard, touch pad, joy stick, or like type of input device may be used to enter information into the computer. The system memory may include computer-readable media such as a ROM and/or RAM. The computer-readable media may also include a hard disk, a magnetic disk, and/or an optical disk. The computer-readable media provides non-volatile storage of the computer executable instructions, data structures, program modules and other data needed to operate the computer. In addition, the computer-readable media provides a database that has a plurality of command codes for controlling the operation of a plurality of different consumer appliances for a plurality of different manufacturers and executable instructions by which the operation and features of a controlling device may be controlled. The hard disk, magnetic disk, and optical disk have associated drives that are connected to the system bus by a hard disk drive interface, a magnetic disk drive interface, and an optical disk drive interface, respectively.

Figure 2:
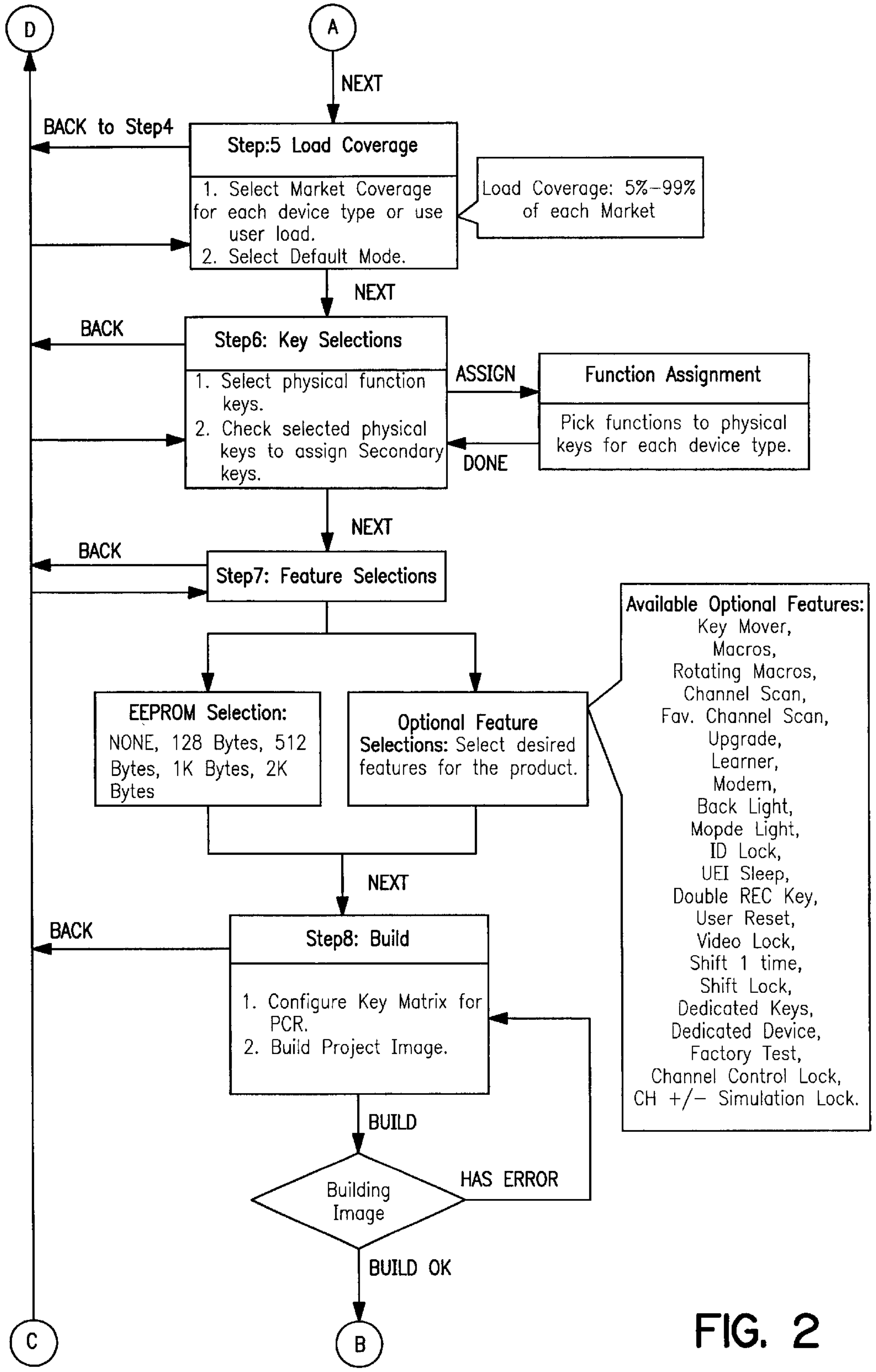
Figure 3:
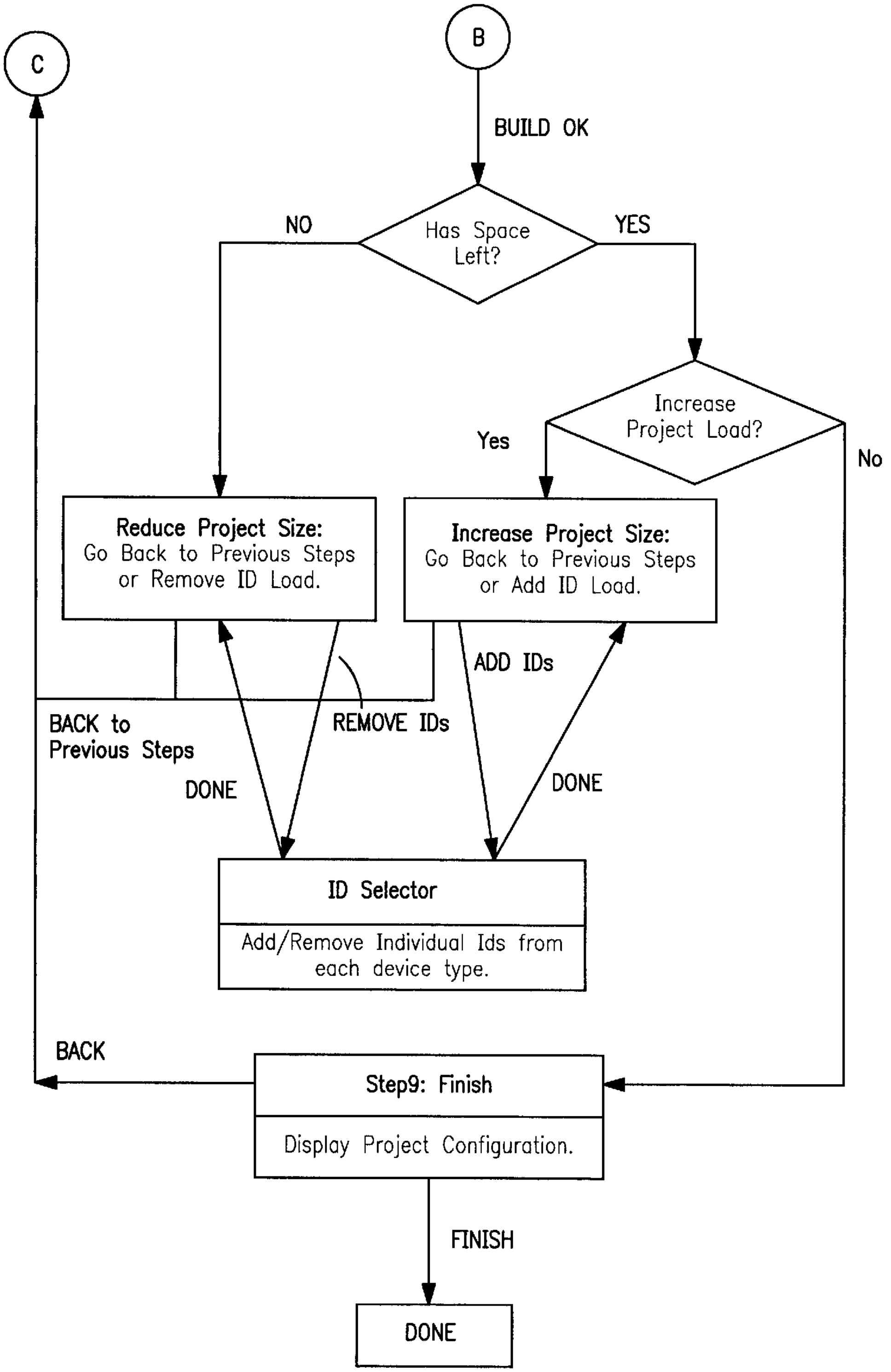
Figure 4:
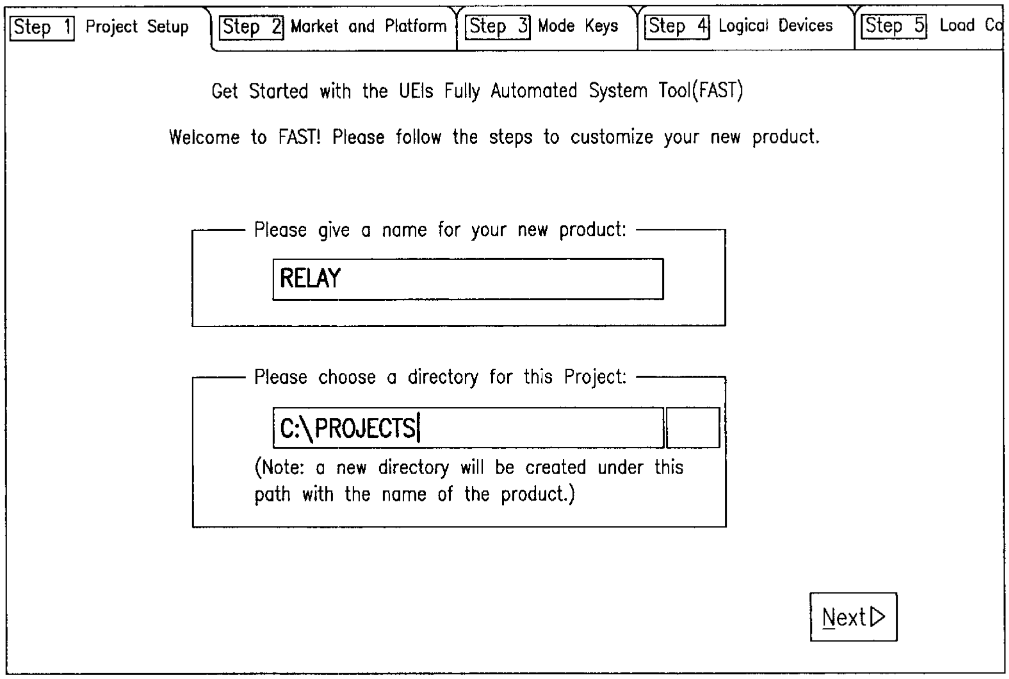
FIG. 4 illustrates an exemplary screen shot by which a user can designate a project name for the controlling device to be created in accordance with the method illustrated in FIGS. 1–3.

To create a controlling device, as illustrated in FIGS. 1–3, the user will cause certain command codes and executable instructions to be selected from the database for storage in the memory of the controlling device as well as select the desired processor chip, memory, and keyboard layout for the controlling device. To gain access to the computer and the database, a user may first be required to log-in to the computer by providing a recognized ID and password. Once a user has gained access to the computer, the computer preferably prompts the user for a project name. The project name may include, by way of example, a file name and a file directory. In this manner, the project can be stored and, in the future, accessed and/or edited as desired. An example of a prompting screen is illustrated in FIG. 4.

Figure 5:
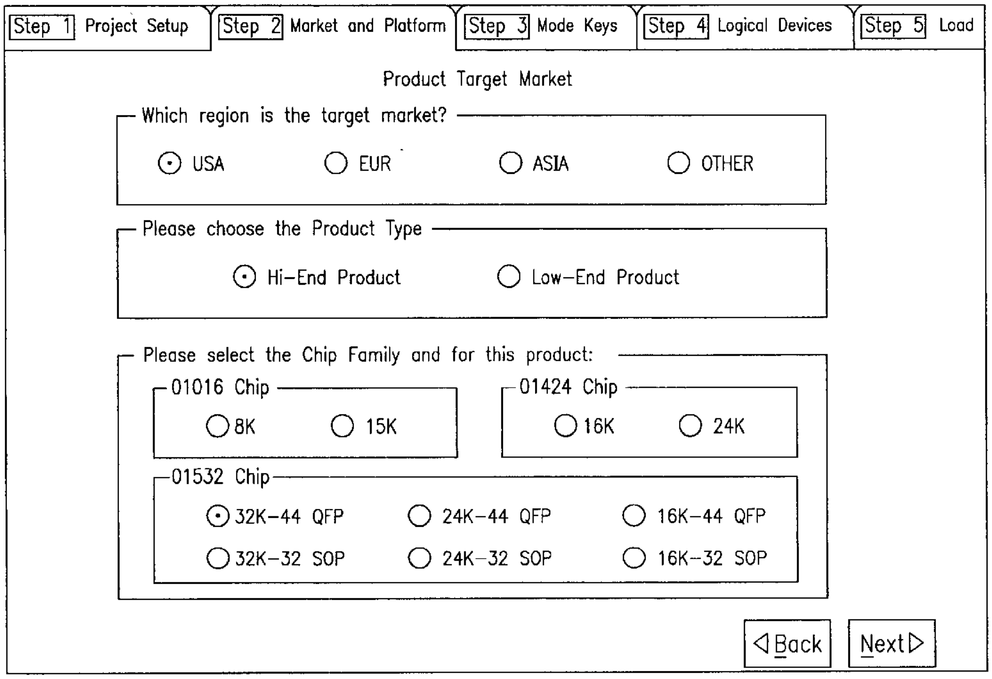
FIG. 5 illustrates an exemplary screen shot of a graphical user interface (GUI) by which the user selects criteria for creating the controlling device in accordance with the method illustrated in FIGS. 1–3.

For use in the process of creating the controlling device, the computer prompts the user for information pertaining to the intended end use and desired characteristics of the controlling device to be created. The initial information requested of the user may include, but is not limited to, the desired target market region, the desired product type, and the desired processor chip to be included in the controlling device, as seen in the exemplary screen shot of FIG. 5. The selection of a target market region, e.g., USA, Europe, or Asia, is used by the computer to select a subset of the plurality of the command codes stored in the database for possible inclusion in the command code library that is to be placed into the memory of the controlling device. By way of example, selection by the user of "USA" as a target market will cause the computer to select those command codes from the database that are used to control the operation of consumer appliances typically found in the United States/North America. The selection of the target market may also be used by the computer to provide an initial suggested mapping of command codes to command keys that will be placed on the controlling device.

The selection by the user of a low-end or high-end product is also used by the computer to select a subset of executable instructions from the database corresponding to a typical feature set for that class of product, for possible storage in the memory of the controlling device. This selection may also be used by the computer to provide an initial suggested mapping of command codes to command keys. The designation of a low-end device versus a high-end device merely refers to the intended end use of the controlling device. As will be appreciated, the intended end use of the controlling device has an impact on the number of features and command code/command key sets that the controlling device is expected to support. By way of example, a high-end device (e.g., a remote control to be used in connection with a home theater) would be expected to have command code/command key sets for commanding the performance of a greater number of operations by the consumer appliances and support more features than would a low-end device (e.g., a remote control to be packed in the box of a cheap television).

While the memory selected by the user will influence the amount of information that may be stored in the controlling device, the type of processor chip selected by the user for use in the controlling device will also influence which features the computer may select for inclusion in the controlling device. For example, if the chip selected by the user has a QFP pin layout (having 44 pins), the controlling device can support a mode LED feature. If, however, the chip selected by the user has a SOP pin layout (having 32 pins), the controlling device cannot support a mode LED feature since the SOP chip will have an insufficient number of I/O pins to control the operation of the LEDs needed to support the mode LED feature. As will be understood, the mode LED feature is used to flash/illuminate a LED on the controlling device to provide a user with an indication of the current mode of operation of the controlling device. Thus, in the case of a selected SOP processor chip, the computer will not permit selection for inclusion in the memory of the controlling device those executable instructions needed to implement the mode LED feature.

Figure 6:
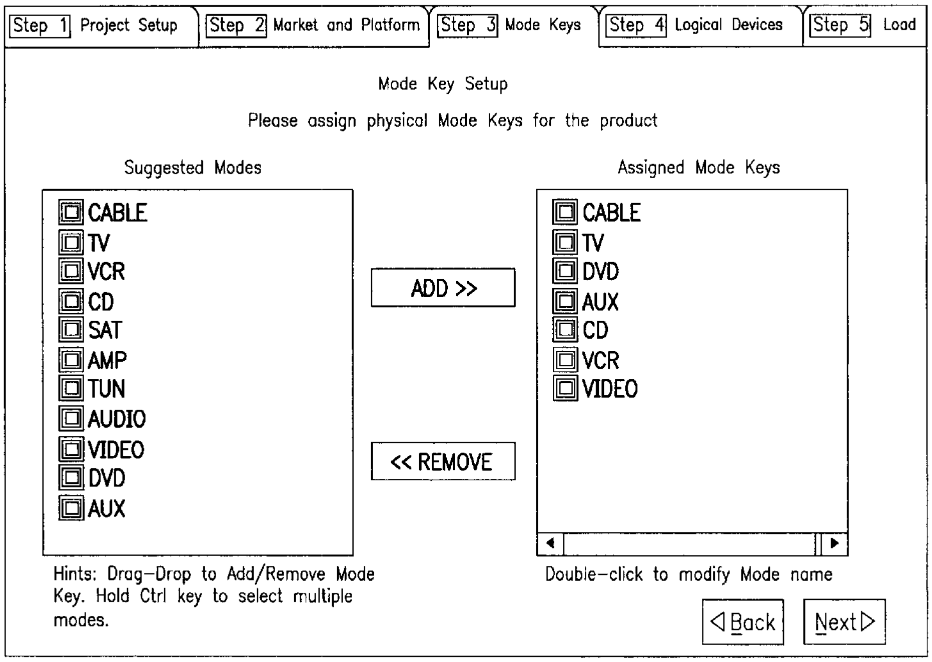
FIG. 6 illustrates an exemplary screen shot of a GUI by which the user selects the operating modes of the controlling device to be created in accordance with the method illustrated in FIGS. 1–3.

For determining which modes of operation the controlling device will support, the user is prompted to select one or more modes from a displayed list of available modes for the controlling device. As will be appreciated by those of skill in the art, the placing of the controlling device into a particular mode causes the controlling device to access designated command code sets from the command code library stored in the memory of the controlling device. The controlling device may be placed into a particular mode in response to the activation of a mode key placed on the keyboard of the controlling device. To select which physical mode keys the controlling device will support, as illustrated in the exemplary screen shot of FIG. 6, the user can either drag a mode from the "suggested modes" list and drop the mode to the "assigned mode keys" list or select one or more of the modes in the "suggested modes" list and click on the "add" button.

Figure 7:
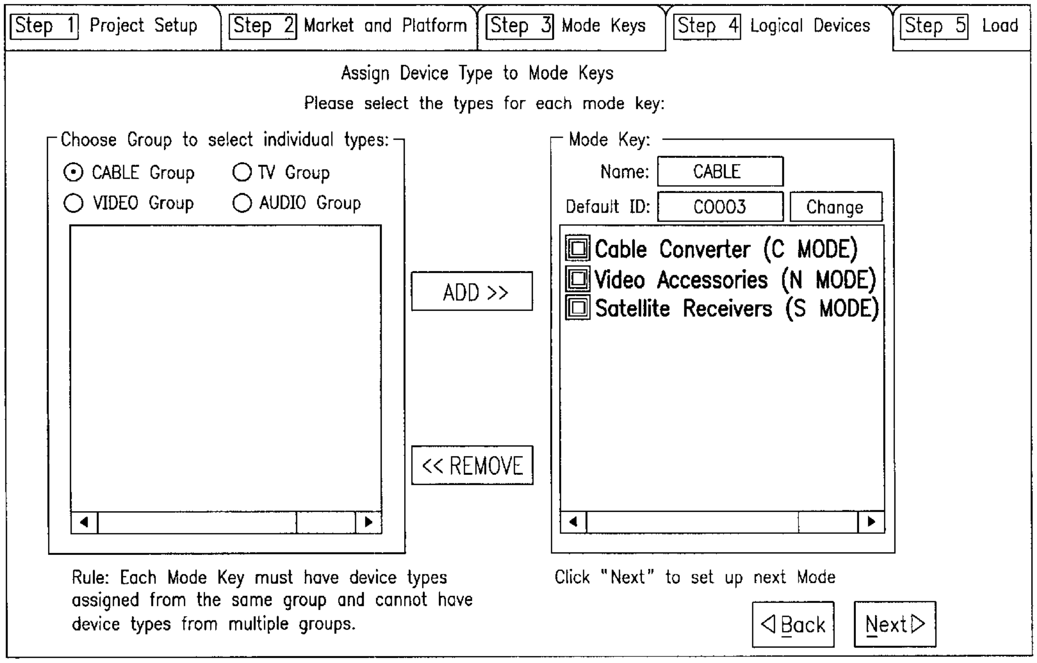
FIG. 7 illustrates an exemplary screen shot of a GUI by which the user selects consumer appliance types for the operating modes of the controlling device to be created in accordance with the method illustrated in FIGS. 1–3.

Once the user has selected which physical mode keys the device will include, the user then selects which types of consumer appliances will be capable of being controlled when a particular physical mode key is activated. By way of example, and as illustrated in the screen shot of FIG. 7, the controlling device can be configured such that it will access the command code set(s) in its memory that are capable of commanding the operation of a cable converter, video accessory, and/or satellite receiver when the "cable" mode key is activated.

The types of consumer appliances that may be assigned to mode keys are preferably divided into consumer appliance type groups. Examples of consumer appliance type groups include a cable device type group, TV device type group, audio device type group, and video device type group. For example, cable boxes, satellite boxes, and video accessories can be classified as belonging to the "cable" group and laser disc players, DVD players and VCRs can be classified as belonging to the "video" group.

In keeping with the designated groupings, each command code set that is used to control the operation of the types of consumer appliances that form a group is assigned a unique set up code, or "ID number." These ID numbers are maintained in the database and, when a command code set is stored in the memory of the controlling device, the ID number corresponding to that command code set is also provided to the controlling device. In this manner, as will be appreciated by those of skill in the art, the ID number assigned to a command code set can be input by a user of a controlling device to set-up the controlling device to command the operation of a preferred consumer appliance when the corresponding mode of operation is active. Typically, for use in setting up the controlling device, the user is provided, in a user's manual or the like, with a list of ID numbers and the model number/manufacturer of the consumer appliance that the command code set corresponding to the ID number is intended to control. For reasons that will be explained in greater detail below, it is also preferred that command code sets within a group be arranged in a sequential order based upon the descending popularity of the consumer appliances intended to be controlled by each command code set. Such popularity order may be determined from installed base data, consumer surveys, sales statistics, or the like. In a preferred embodiment, this order is maintained via a separate cross-reference to permit adjustments to be made from time to time as popularity changes. This additionally allows separate lists to be maintained for each market, since a given command code set may not enjoy equal popularity in every geographical region.

When a sequential assignment of ID numbers to command code sets within a device type group is used, types of consumer appliances within a single group can be selected for inclusion under a single physical mode key without creating an ambiguity. However, since the selection of types of consumer appliances from different device type groups can create problems in the set-up mode of the controlling device, the computer should prevent users from placing device types from different groups under a single mode key during the controlling device creation process. For example, the computer should not allow a user to mix TVs and audio devices under a single "TV" mode key as it is likely that both the TV group and the audio group will have a command code set having a common ID number (e.g., "123") such that the inclusion of both under the "TV" mode would result in a controlling device that would not being able to reconcile the entry of the common ID number during the TV mode set-up process.

Figure 8:
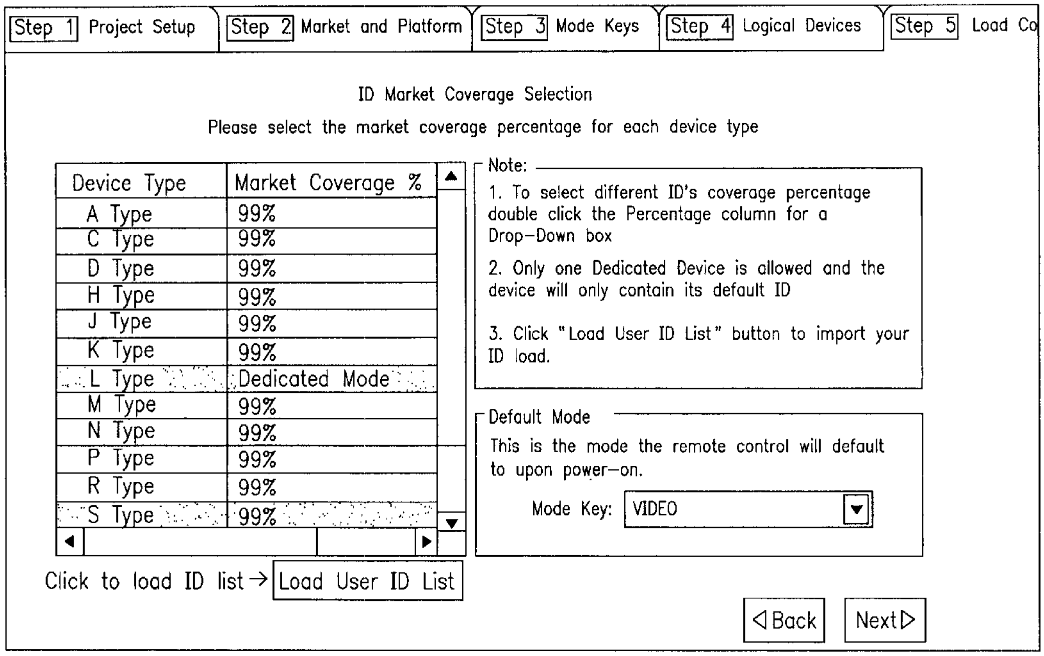
FIG. 8 illustrates an exemplary screen shot of a GUI by which the user selects a market coverage for the consumer appliance types and specifies a power-on default for the operating modes of the controlling device to be created in accordance with the method illustrated in FIGS. 1–3.

To finish the initial process of selecting the command codes that are to be included in the command code library, the user is prompted to select a desired market coverage. An exemplary screen shot of an appropriate prompt is illustrated in FIG. 8. The market coverage is the percentage of the installed base of a type of consumer appliance that the controlling device is expected to support. The user is expected to select a desired market coverage for each type of product in each mode that the user previously selected. By way of example, if the user selects 95% for consumer appliances of the type TV, the user is requesting that the computer include enough command code sets in the command code library such that 95 out of every 100 TV sets currently in use by consumers in the selected target market region (e.g., USA) would be expected to be operable using the controlling device. For use in this process, the database also maintains an approximate percentage of the installed base of the consumer appliances that a given command code set is expected to operationally control.

To arrive at the command code library that has the desired market coverage, the command code library is initially created with the command code sets from the database that are capable of commanding the operation of the consumer appliances of the selected type(s) within the selected market region. This command code library is then pared down to arrive at the selected percentage of coverage for the selected device type(s). Specifically, command code sets are eliminated from the command code library for each device type in a descending order as a function of their assigned popularity (i.e., by eliminating the command codes corresponding to less popular devices).

If the user has manually edited the list of command codes as will be described in more detail later, overriding the automatic selection process, the user will be notified, for example, by highlighting an consumer appliance type field. In this manner, the user will be informed that a manual selection of command code sets for inclusion/exclusion in the command code library is in effect. The manual selection of command code sets may be intermixed with the automated method described above, with some device types configured manually and others automatically. It is also possible for an explicit user-provided list of ID numbers to be used to create the command code library, via the "load user ID list" icon shown in FIG. 8

When establishing the market coverage for types of consumer appliances capable of being commanded by the controlling device, a user may also select that a particular consumer appliance type is to have a dedicated command code set. To this end, the user may selected that that desired type of device is to be operated in the dedicated mode. In connection with this selection, the user will designate one, unchangeable command code set, preferably by its assigned ID number, for inclusion in the command code library for the given type of device. For example, if the controlling device is to be shipped with a specific product (e.g., VCR), the command code library for the mode corresponding to the type of device may be configured to include only the command code set(s) that control the operation of the specific product. In this manner, a dedicated VCR, universal TV and universal cable box command code library for a controlling device can be created by the computer.

For designating which type of device(s) the controlling device will be configured to control when it is first powered-up, the user may also be provided with the ability to select a default mode and default command code set for each device type in the selected modes. The selection of a default mode may be made using the screen shown in FIG. 8 (VIDEO in the example shown) and default command code set(s) for each mode may be made using the screen shown in FIG. 7 (Cable mode default to device ID C0003 in the example shown). If the user does not designate a command code set to be used as the default command code set for the device type(s) in the selected modes, the command code set that has the highest popularity should be used as the default command code set for the device type(s). This default configuration of the controlling device may be altered by a user through commonly known set-up procedures.

Once the above-described process is completed for all of the selected types of consumer appliances in all of the selected modes, the command codes that meet the various criteria entered by the user will be those command codes that comprise the command code library. It will be appreciated that, upon completion of this process, the command code library created by the computer will include command code sets capable of commanding the operation of consumer appliances of specified types typically used in a specified region with a selected, approximate percentage of market coverage for the consumer appliances within the specified region.

Figure 9:
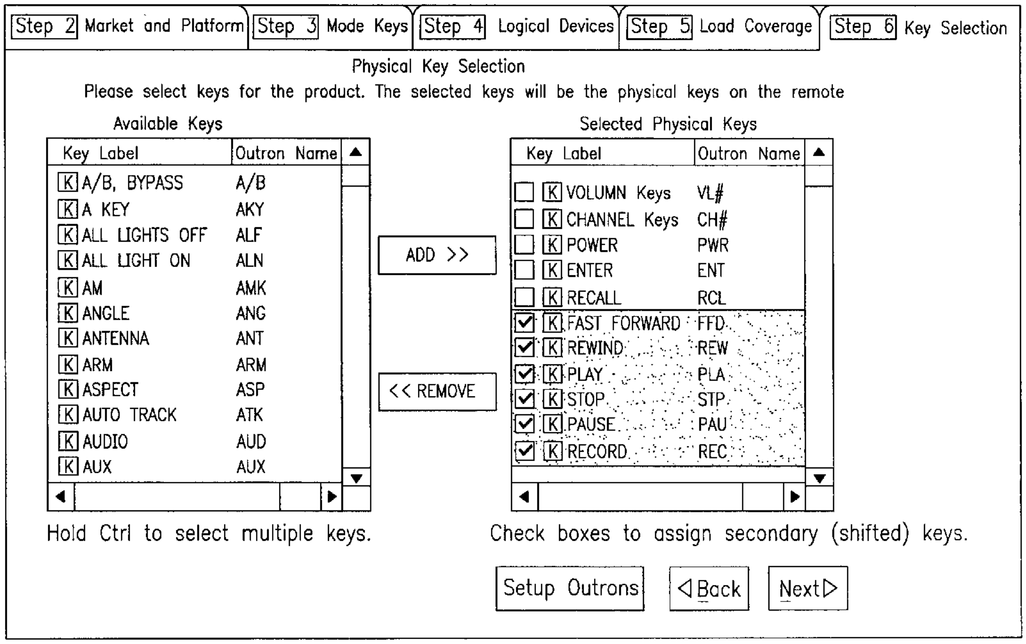
FIG. 9 illustrates an exemplary screen shot of a GUI by which the user selects the physical keys for the controlling device to be created in accordance with the method illustrated in FIGS. 1–3.

In addition to creating the command code library, the user is also guided through steps for creating the keyboard to be included with the controlling device. To this end, the user is presented with a screen, an example of which is illustrated in FIG. 9, by which the user can drag and drop, select and add, etc. the desired physical keys from an "available key" list to a "selected physical key" list. When the controlling device is to be a universal remote control, it is preferred that some physical keys be pre-selected and in the "selected physical key" list, e.g., digit keys, volume keys, channel keys and a power key. The "available key" list may include all possible keys or may be limited by the computer as a function of whether the device was designated to be a high-end or a low-end device. Once the physical keys have been defined as described above, activation of the "setup outrons" icons will take the user to the setup outrons screen, an example of which is illustrated in FIG. 10. An outron is a tag that is assigned to a physical key—e.g. "FFD" for the physical key which is to be labeled "Fast Forward", or "PWR" for the physical key that is to be labeled "Power", on the completed remote control. (It will be appreciated that on the final remote control product these labels may take the form of shapes or icons in place of alphanumerics, such as ">>" for "Fast Forward".) The outron tags are used to associate each physical key with its specific command function for each of the consumer appliance types selected by the user, in the manner described below.

To set-up the outrons, the user will interact with the computer to assign or map device functions (i.e., acts to be performed in response to the receipt of a command code) to the physical keys previously designated for the controlling device. To this end, the database preferably has a pre-configured mapping for each device type given the criteria selected by the user (e.g., high-end/low-end and USA/Asia/Europe). The pre-configured mapping is displayed to the user in an the initial outron set-up screen. The user may opt to use the suggested mapping or may move/delete device functions using, for example, standard drag and drop GUI techniques.

More specifically, the illustration of FIG. 10 depicts physical keys configured for the controlling device in the left hand column with the command functions currently assigned to each key for each device type selected by the user. The column on the extreme right shows the additional command functions still available but not assigned for the device type selected (in the example, the "A" or amplifier device type). By way of further example, a designer who wants to change the amplifier device to support input selects in place of digit keys can grab DP0 through DP9 in column "A" and drag them over to the "available but unselected" list. This action leaves keys DP0 through DP9 blank in the "A" column (i.e., no functions assigned thereto). The user can then select input switching functions from the pool of available functions (e.g., "CD" and "TAPE") and drag them into the now blank spaces to map these functions to the selected keys.

The ability to interactively assign functions to command keys on a device ID by device ID basis is also desirable. For example, a particular model or brand of consumer appliance may require a function that is so critical to the use of that consumer appliance that, for that device ID only, the function should be available somewhere on the keypad even if a physical key does not exist for it. For this purpose, the screen displayed to the user can display a drop down list, or the like, by which the user can select a device, by its device ID number, to place the screen in a mode by which the user can assign functions to command keys for that device.

Yet another desirable feature is the ability to assign "shifted", or alternate, functions to certain keys. A "shifted" function on a remote control is accessed by the user pressing a "shift" key immediately prior to the function key, causing the function key in question to transmit an alternative IR command code, for example the ">>" key for a CD player may send a "track skip" command in the regular mode and a "disk skip" command in the "shifted" mode. This feature allows extra functions to be offered on a remote control while still retaining a reasonable total number of keys. In an alternative implementation, the user presses the "shift" key together with the function key rather than immediately prior to it, however the effect is the same. Referring again to FIG. 9, during the physical key selection process any keys which are to support shifted functions are designated via a clickable check box in the Selected Physical Key table. In the specific example shown, the Fast Forward, Rewind, Play, Stop, Pause, and Record keys are so designated. Referring now to FIG. 10, it will be noted that these key labels are repeated at the end of the Outron Assignment table (shaded) to allow suitable secondary functions to be assigned to them. After the user has completed the mapping of functions to command keys, signified to the computer by the user clicking on the "confirm" icon, the user is prompted to indicate which features are desirable to be included in the controlling device. As illustrated in FIG. 11, selection of the features may be accomplished by interacting with check boxes or the like displayed to the user. The computer may cause certain features to be pre-selected as a function of the criteria previously established for the device (e.g., high-end/low-end). Preferably, all default features are pre-selected for all products. Examples of default features include, but are not limited to:

Direct Set-up—feature whereby the user may set up a remote control to match the customer's devices. Using the keypad, the user enters an ID code corresponding to the brand and model for each device type supported by the operating modes of the remote.

Mode Mover—feature whereby a mode key can be reassigned to a different device type than its default. For example, a user with no cable box but two VCRs might want to reassign the "cable" mode key to place the remote in a second "VCR" mode.

Audio Lock—feature whereby a specific device is designated as the master audio control across modes of operation, such as TV, VCR, and Cable. The remote will always send that device's volume command codes in response to activation of audio command keys no matter which of the modes the remote is in.

Blink Back—feature whereby a LED blinks the device ID number to which the remote is currently set.

Library Search—feature whereby the library of command codes can be searched and used to determine if a command code set is appropriate for operating a given consumer appliance.

Master Reset—feature whereby the remote control can be returned to its default operating mode.

With respect to the optional features that may be added to the remote control, certain of the check boxes related to the features may be disabled by the computer based upon the processor chip and memory chip selectable by the user (e.g., the mode LED feature or certain features that require an EEPROM). In addition, since some features are related to other features, the computer will select related features automatically for the user (e.g., a product should have the "channel scan" feature if the "favorite channel scan" feature is selected). Certain of the features will ask the user to set up the mode keys and/or group of keys a feature should be locked to. In this regard, locking means that the function or operation mapped to a command key will operate across all or some of the modes of the controlling device. Examples of features that may be included in a controlling device include, but are not limited to:

CHANNEL SCAN—feature whereby pressing a special "SCAN" key starts the remote sending "Channel Up" once every 3 seconds, until any other key is pressed.

MACRO—feature whereby a command key on remote can be programmed to cause the sending of one or more command codes.

FAVORITE CHANNEL SCAN—feature by which a user can pre-program the unit with his favorite channels which can then be scanned through.

ID LOCK—feature primarily used in OEM or Cable markets. Allows a particular device code (e.g. a specific model cable box) to be set up at the factory or by the installer and locked in, so the end user cannot change the set up for that specific mode.

ILLUMINATED KEYPAD—feature for controlling keypad illumination.

KEYMOVER—feature whereby a key on the keypad can be reassigned to send a different code.

LEARNING—feature by which a remote can be "taught" a new key function by the user, usually by placing his original unit close to the learning remote and pressing the button he wants it to learn.

POWER TOGGLE—feature by which the "Power" key only turns power off. Power is turned on by pressing any digit key (i.e. selecting the channel desired).

SHIFT—feature by which one or more keys can be assigned a secondary command code.

SLEEP—feature by which the remote emulates a "sleep" command by sending "Power Off" after a set interval. Interval is selected by user in 15 minute increments by repeated presses of the key.

The selection by the user of a feature will cause the computer to select from the database for storing in the memory of the controlling device the executable instructions needed by the controlling device to perform the selected feature.

Figure 13:
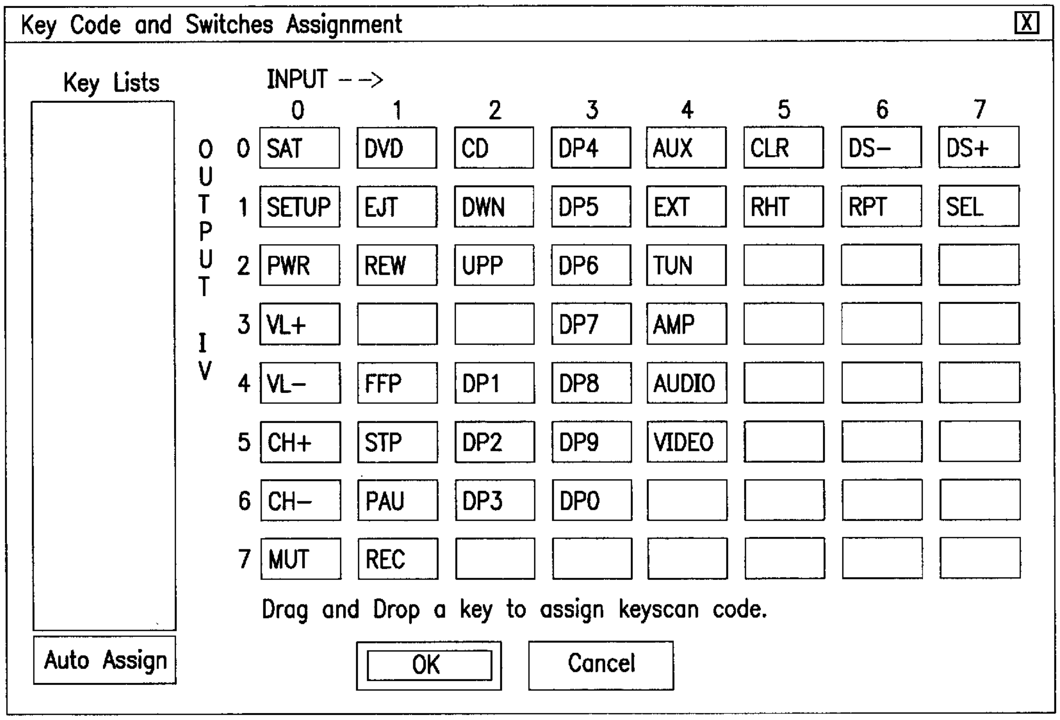
FIG. 13 illustrates an exemplary screen shot of a GUI by which the user can edit key code and switch assignments in accordance with the method illustrated in FIGS. 1–3.

In connection with selecting the features desired to be included in the controlling device, the user may choose to configure the physical keyboard matrix. Although the computer automatically assigns a physical crosspoint in the key matrix to every key selected as part of the process described in connection with FIG. 9, it is sometimes desirable to assign specific keys to particular locations in the matrix in order optimize printed circuit board layout and mechanical design. To this end, the user can be presented with a key matrix display, an example of which is shown in FIG. 13, by which the user can drag and drop the previously selected physical keys to arrange the location of the physical keys on the printed circuit board which will form part of the controlling device. At this time, the user can also command the computer to build the command code library, executable instructions needed to operate the controlling device and perform the selected features, the device IDs, and the command code/command key maps that have been created by the above-described processes which will be stored in the memory of the controlling device.

Figure 12:
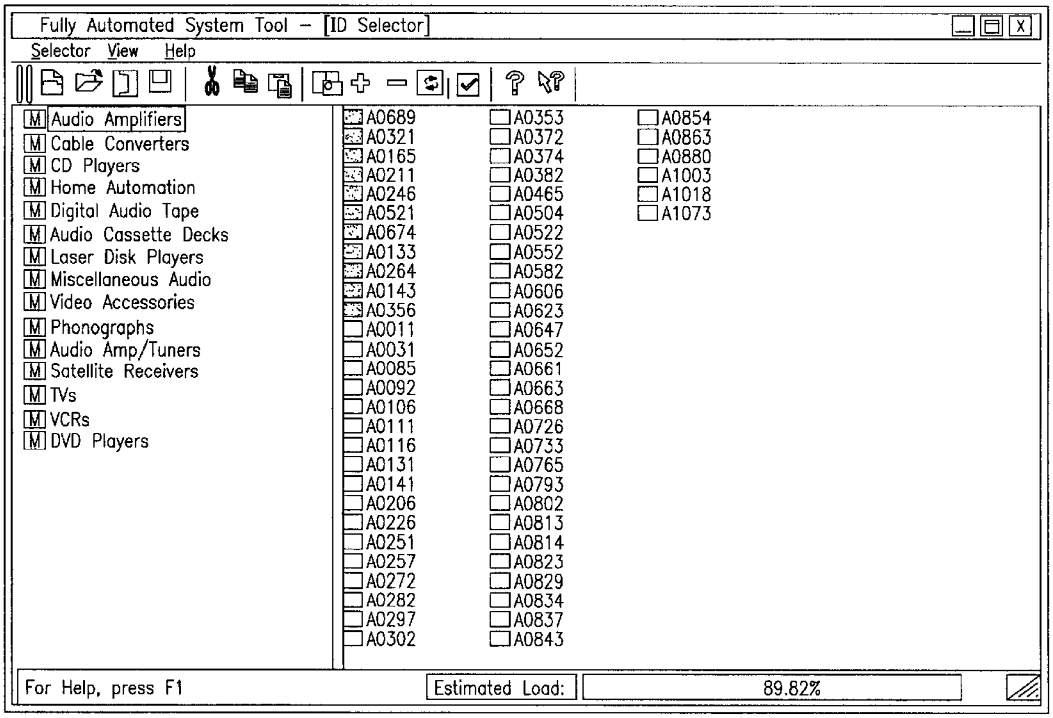
FIG. 12 illustrates an exemplary screen shot of a GUI by which the user can edit the individual command code sets to be included in the controlling device to be created in accordance with the method illustrated in FIGS. 1–3.

During the build, the computer may provide an indication as to an estimated memory utilization, or "load" that would result from storing the build on the selected chip(s). If the load on the memory is too great, the user may elect to include a larger memory in the controlling device and/or elect to remove certain command code sets and/or features from the build. If the memory has load to spare, the user can elect to add command code sets and/or add features to the build. In this case, the user may also elect to reduce the amount of memory in the controlling device. The user can effect this by returning to any of the steps previously described in conjunction with FIGS. 5 through 11 iteratively, or by customizing the load by adding or removing command code sets to the build, by device ID, for the various modes to be included in the controlling device as is illustrated by way of example in FIG. 12.

When the build is complete, the build may be downloaded to the memory of a controlling device, having the desired microprocessor, memory and keyboard matrix, to thereby provide a controlling device having the desired command code library and features for the intended end use of the controlling device. Thus, it will be appreciated that the described system and method allows a designer to interactively make tradeoffs between chip size, features, coverage, number of keys, etc. during the design of a controlling device. Furthermore, the resultant executable instructions and command code library are built from an "erector set" of standardized, pretested, and prequalified modules with little or no human intervention or programming required, thereby greatly improving the reliability of the final product while simultaneously reducing development and testing time. In this manner, the described system and method allows a controlling device to be created that is best suited for its intended end use while being developed with a savings in both time and cost.

All patents discussed in this document are hereby incorporated by reference in their entirety.

While specific embodiments of the invention have been described in detail, it will be appreciated by those skilled in the art that various modifications and alternatives to those details could be developed in light of the overall teachings of the disclosure. For example, the processes described with respect to computer executable instructions can be performed in hardware without departing from the spirit of the invention. Accordingly, the particular arrangement disclosed is meant to be illustrative only and not limiting as to the scope of the invention which is to be given the full breadth of the appended claims and any equivalents thereof.

What is claimed is:

1. A method for creating a controlling device having a memory, comprising:

accepting via a user interface input that functions to specify a plurality of different controllable devices whereby command code sets from a library of command code sets that are remote from the controlling device and which are appropriate for commanding operations of the plurality of different controllable devices are selected as a function of the input for inclusion into a build adapted to be downloaded into the memory of the controlling device;

displaying via the user interface an estimated memory utilization of the build;

displaying via the user interface an option which is selectable to enable modification of which command code sets are included in the build to thereby modify the estimated memory utilization of the build; and displaying via the user interface an option which is selectable to cause downloading of the build for inclusion into the memory of the controlling device.

2. The method as recited in claim 1, wherein the command codes selected are appropriate for commanding devices within a geographic region.

3. The method as recited in claim 1, wherein the command codes selected cover an install base of a type of consumer appliance.

4. The method as recited in claim 1, wherein the build further comprises instructions for operating the controlling device.

5. The method as recited in claim 1, wherein the build further comprises a mapping between keys of the remote control and command codes.

6. The method as recited in claim 1, wherein the build further comprises identifiers which are assigned to predetermined subsets of the selected command codes.

7. The method as recited in claim 1, comprising accepting input via the user interface for mapping command codes to command keys of the controlling device.

8. The method as recited in claim 7, comprising accepting input via the user interface for configuring a layout of the command keys.

9. The method as recited in claim 8, wherein the user interface provides drag and drop capabilities.

10. A method for using a network enabled computing interface to access instructions for use in creating a controlling device having a memory, comprising:

accepting via the network enabled computing interface input that functions to specify a plurality of different controllable devices whereby command code sets from a library of command code sets that are remote from the controlling device and which are appropriate for commanding operations of the plurality of different controllable devices are selected by the instructions as a function of the input for inclusion into a build adapted to be downloaded into the memory of the controlling device;

displaying via the network enabled user interface an estimated memory utilization for the build as determined by the instructions;

displaying via the network enabled user interface an option which is selectable to enable modification of which command code sets are included in the build to thereby modify the estimated memory utilization of the build; and displaying via the network enabled user interface an option which is selectable to cause downloading of the build for inclusion into the memory of the controlling device.

11. The method as in claim 10, wherein the network enabled computing interface comprises a graphical user interface.

12. The method as in claim 11, wherein the user interface is located remotely from the instructions.

* * * * *